United States Patent
Park et al.

(10) Patent No.: US 9,867,097 B2
(45) Date of Patent: Jan. 9, 2018

(54) METHOD AND APPARATUS FOR RECEIVING CONTROL INFORMATION IN WIRELESS CONNECTION SYSTEM

(71) Applicant: LG ELECTRONICS INC., Seoul (KR)

(72) Inventors: Changhwan Park, Anyang-si (KR); Yusung Lee, Anyang-si (KR); Youngdae Kim, Anyang-si (KR); Changsoo Lee, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 76 days.

(21) Appl. No.: 14/894,926

(22) PCT Filed: May 30, 2013

(86) PCT No.: PCT/KR2013/004753
§ 371 (c)(1),
(2) Date: Nov. 30, 2015

(87) PCT Pub. No.: WO2014/193003
PCT Pub. Date: Dec. 4, 2014

(65) Prior Publication Data
US 2016/0127960 A1    May 5, 2016

(51) Int. Cl.
*H04W 36/04* (2009.01)
*H04J 11/00* (2006.01)
(Continued)

(52) U.S. Cl.
CPC ............ *H04W 36/04* (2013.01); *H04J 11/00* (2013.01); *H04L 1/1812* (2013.01);
(Continued)

(58) Field of Classification Search
None
See application file for complete search history.

(56) References Cited

U.S. PATENT DOCUMENTS

| 8,965,429 | B2 * | 2/2015 | Forster ................... H04W 4/20 |
| | | | 455/450 |
| 2009/0259909 | A1 * | 10/2009 | Luo ....................... H04L 1/0038 |
| | | | 714/748 |

(Continued)

FOREIGN PATENT DOCUMENTS

| KR | 10-2010-0133489 | 12/2010 |
| KR | 10-2011-0063279 | 6/2011 |

(Continued)

OTHER PUBLICATIONS

PCT International Application No. PCT/KR2013/004753, Written Opinion of the International Searching Authority dated Feb. 27, 2014, 21 pages.

*Primary Examiner* — Chi H Pham
*Assistant Examiner* — Shick Hom
(74) *Attorney, Agent, or Firm* — Lee Hong Degerman Kang Waimey

(57) ABSTRACT

The present invention discloses a method and an apparatus for a terminal receiving control information, which includes a modified physical hybrid ARQ indicator channel (PHICH) configuration, through a downlink shared channel (DL-SCH), in a heterogeneous network system comprising a macro cell and a femto cell. The method for the terminal receiving the control information in the heterogeneous network system comprising the macro cell and the femto cell, according to one embodiment of the present invention, comprises the steps of: the terminal accessing the macro cell undergoing a handover to the femto cell; and receiving PHICH reconfiguration information from the femto cell through the downlink shared channel (DL-SCH), when the configuration of the physical hybrid ARQ indicator channel (PHICH) used by the terminal which has undergone the handover is modified.

13 Claims, 8 Drawing Sheets

(51) Int. Cl.
  *H04L 5/00* (2006.01)
  *H04L 1/18* (2006.01)
  *H04W 36/30* (2009.01)
  *H04W 72/04* (2009.01)
  *H04W 76/04* (2009.01)

(52) U.S. Cl.
  CPC .......... *H04L 5/0007* (2013.01); *H04L 5/0035* (2013.01); *H04L 5/0055* (2013.01); *H04L 5/0096* (2013.01); *H04W 36/30* (2013.01); *H04W 72/042* (2013.01); *H04W 76/046* (2013.01)

(56) References Cited

U.S. PATENT DOCUMENTS

| | | | | |
|---|---|---|---|---|
| 2012/0122472 | A1* | 5/2012 | Krishnamurthy | H04L 5/0053 455/456.1 |
| 2013/0303152 | A1* | 11/2013 | Kim | H04W 72/082 455/422.1 |
| 2013/0329701 | A1* | 12/2013 | Bajzec | H04L 1/1887 370/336 |

FOREIGN PATENT DOCUMENTS

| | | |
|---|---|---|
| KR | 10-2011-0074747 | 7/2011 |
| KR | 10-2012-0007997 | 1/2012 |
| KR | 10-2012-0010645 | 2/2012 |

* cited by examiner

FIG. 2
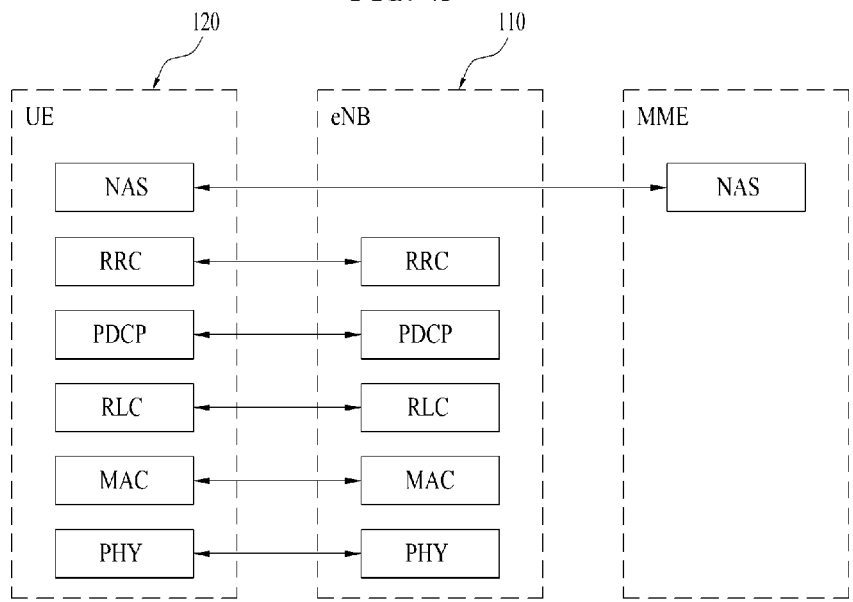
(a) Control-plane protocol stack
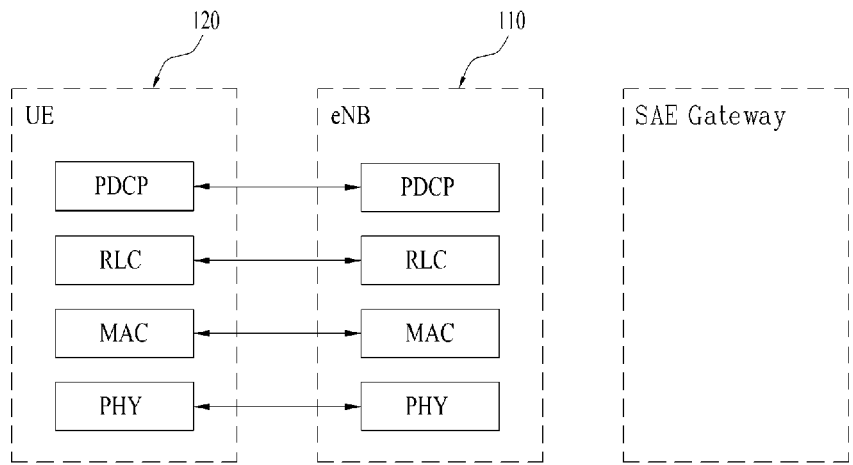
(b) User-plane protocol stack

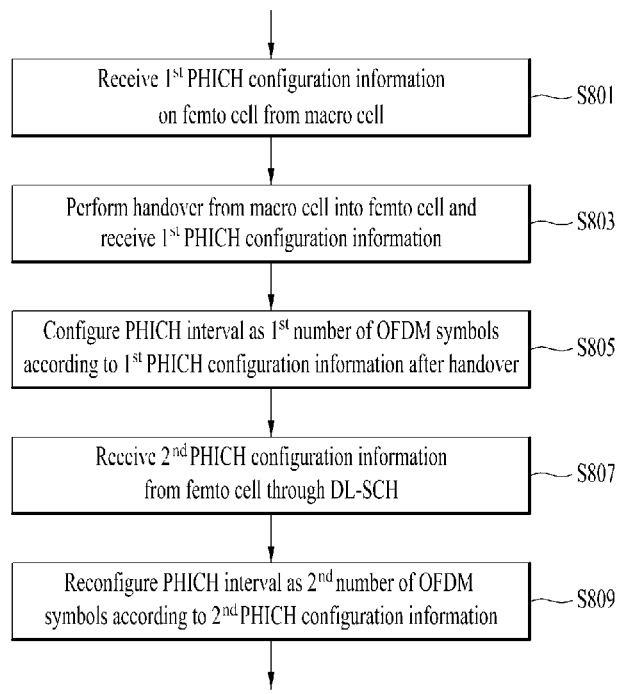

METHOD AND APPARATUS FOR RECEIVING CONTROL INFORMATION IN WIRELESS CONNECTION SYSTEM

CROSS-REFERENCE TO RELATED APPLICATIONS

This application is the National Stage filing under 35 U.S.C. 371 of International Application No. PCT/KR2013/004753, filed on May 30, 2013, the contents of which are hereby incorporated by reference herein in their entirety.

TECHNICAL FIELD

The present invention relates to a wireless access system, and more particularly, a method and apparatus for a user equipment to receive control information containing a changed physical hybrid ARQ indicator channel (PHICH) configuration through a downlink shared channel (DL-SCH) in a heterogeneous network system including a macro cell and a femto cell.

BACKGROUND ART

Wireless communication systems have been widely deployed to provide various types of communication services such as voice or data services. Generally, a wireless communication system is a multiple access system capable of supporting communication with multiple users by sharing available system resources (bandwidth, transmit power, etc.). Multiple access systems include, for example, a code division multiple access (CDMA) system, a frequency division multiple access (FDMA) system, a time division multiple access (TDMA) system, an orthogonal frequency division multiple access (OFDMA) system, a single carrier frequency division multiple access (SC-FDMA) system, a multi carrier frequency division multiple access (MC-FDMA) system, etc.

DISCLOSURE OF THE INVENTION

Technical Tasks

One technical task of the present invention is to provide a method for a user equipment to receive changed PHICH configuration information through a downlink shared channel in a wireless access system, and preferably, in a heterogeneous network system including a macro cell and a femto cell and apparatus for the same.

Another technical task of the present invention is to provide a method for a user equipment to receive offset information indicating a timing of applying changed PHICH configuration information through a downlink shared channel in a heterogeneous network system including a macro cell and a femto cell and apparatus for the same.

Technical tasks obtainable from the present invention are non-limited by the above-mentioned technical tasks. And, other unmentioned technical tasks can be clearly understood from the following description by those having ordinary skill in the technical field to which the present invention pertains.

Technical Solutions

To achieve these objects and other advantages and in accordance with the purpose of the invention, a method of receiving control information received by a user equipment in a heterogeneous network system including a macro cell and a femto cell, the method comprising: receiving a first PHICH (physical hybrid-ARQ indicator channel) configuration information on the femto cell from the macro cell; performing a handover from the macro cell into the femto cell; configuring a PHICH interval as a first number of OFDM (orthogonal frequency division multiplexing) symbols in accordance with the first PHICH configuration information; receiving a second PHICH configuration information from the femto cell through a downlink shared channel (DL-SCH); and reconfiguring the PHICH interval as a second number of the OFDM symbols in accordance with the second PHICH configuration information.

In another aspect of the present invention, further comprising: receiving offset information indicating a timing of applying the second PHICH configuration information from the femto cell through the downlink shared channel.

In another aspect of the present invention, the second PHICH configuration information is received through an MAC (medium access control) control element.

In another aspect of the present invention, the offset information is received through an MAC (medium access control) control element.

In another aspect of the present invention, the second PHICH configuration information is received through an RRC (radio resource control) message.

In another aspect of the present invention, the offset information is received through an RRC (radio resource control) message.

In another aspect of the present invention, reception signal strength between the user equipment and the femto cell is lower than reception signal strength between the user equipment and the macro cell and wherein the handover of the user equipment from the macro cell into the femto cell is performed for cell range expansion.

In another aspect of the present invention, the downlink shared channel comprises a channel specified for the user equipment.

In another aspect of the present invention, a method of transmitting control information transmitted by a femto cell in a heterogeneous network system including a macro cell and the femto cell, the method comprising: receiving downlink channel information including a downlink channel signal measurement value from a user equipment handed over from the macro cell; transmitting PHICH (physical hybrid-ARQ indicator channel) configuration information to the user equipment through a downlink shared channel (DL-SCH) when the downlink channel signal measurement value is equal to or smaller than a reference value.

In another aspect of the present invention, further comprising: transmitting the PHICH configuration information to the user equipment through a physical broadcast channel (PBCH) when the downlink channel signal measurement value is greater than the reference value.

In another aspect of the present invention, further comprising: transmitting offset information indicating a timing of applying the PHICH configuration information to the user equipment.

In another aspect of the present invention, the PHICH configuration information is transmitted through one of an MAC (medium access control) control element and an RRC (radio resource control) message.

In another aspect of the present invention, the offset information is transmitted through one of an MAC (medium access control) control element and an RRC (radio resource control) message.

In another aspect of the present invention, the user equipment of receiving control information in a heterogeneous network system including a macro cell and a femto cell, the user equipment comprising: an RF (radio frequency) unit; and a processor configured to: receive a first PHICH (physical hybrid-ARQ indicator channel) configuration information on the femto cell from the macro cell, perform a handover from the macro cell into the femto cell, configure a PHICH interval as a first number of OFDM (orthogonal frequency division multiplexing) symbols in accordance with the first PHICH configuration information after the handover, receive a second PHICH configuration information from the femto cell through a downlink shared channel (DL-SCH), reconfigure the PHICH interval as a second number of the OFDM symbols in accordance with the second PHICH configuration information.

In another aspect of the present invention, a femto cell transmitting control information in a heterogeneous network system including a macro cell and the femto cell, the femto cell comprising: an RF (radio frequency) unit; and a processor configured to: receive downlink channel information including a downlink channel signal measurement value from a user equipment handed over from the macro cell, configured to transmit PHICH (physical hybrid-ARQ indicator channel) configuration information to the user equipment through a downlink shared channel (DL-SCH) when the downlink channel signal measurement value is equal to or smaller than a reference value.

It is to be understood that both the foregoing general description and the following detailed description of the present invention are exemplary and explanatory and are intended to provide further explanation of the invention as claimed.

Advantageous Effects

According to an embodiment of the present invention, a user equipment can receive control information containing a changed PHICH configuration through a downlink shared channel in a wireless access system, and preferably, in a heterogeneous network system including a macro cell and a femto cell.

According to another embodiment of the present invention, a user equipment can receive offset information indicating a timing of applying a changed PHICH configuration through a downlink shared channel in a heterogeneous network system including a macro cell and a femto cell.

Effects obtainable from the present invention are non-limited by the above mentioned effects. And, other unmentioned effects can be clearly understood from the following description by those having ordinary skill in the technical field to which the present invention pertains.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 is a diagram for examples of radio interface protocol structures between a user equipment and E-UTRAN based on 3GPP radio access network standard.

FIG. 8 is a flowchart to describe a method for a user equipment to receive control information according to one embodiment of the present invention.

FIG. 9 is a diagram for one example of LCID (logical channel ID) field according to the present invention.

BEST MODE FOR INVENTION

Figure 1:
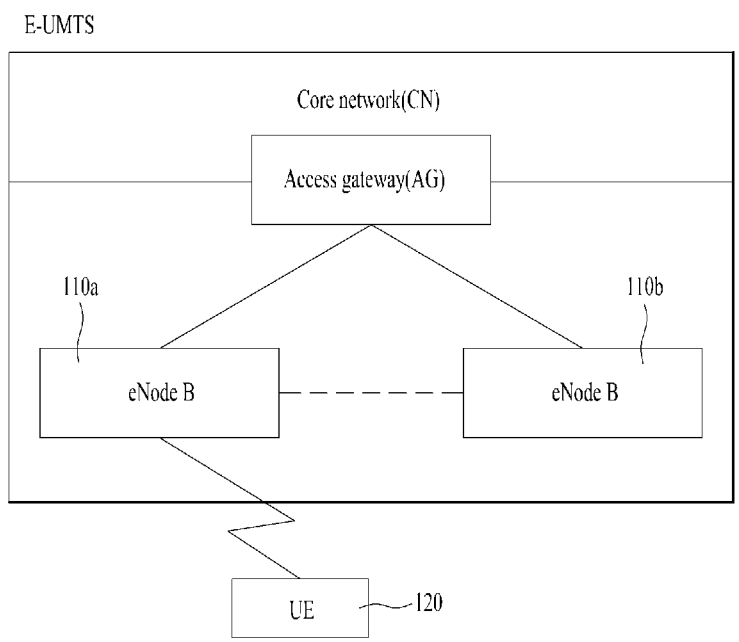
FIG. 1 is a schematic diagram of a network structure of E-UMTS (evolved universal mobile telecommunications system).

The following embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be substituted with corresponding structural elements or features of another embodiment.

In this specification, embodiments of the present invention are described centering on the data transmission/reception relations between a base station and a terminal. In this case, the base station may be meaningful as a terminal node of a network which directly performs communication with the terminal. In this disclosure, a specific operation explained as performed by a base station may be performed by an upper node of the base station in some cases.

In particular, in a network constructed with a plurality of network nodes including a base station, it is apparent that various operations performed for communication with a terminal can be performed by a base station or other networks except the base station. 'Base station (BS)' may be substituted with such a terminology as a fixed station, a Node B, an eNode B (eNB), an access point (AP) and the like. A relay may be substituted with such a terminology as a relay node (RN), a relay station (RS) and the like. And, 'terminal' may be substituted with such a terminology as a user equipment (UE), a mobile station (MS), a mobile subscriber station (MSS), a subscriber station (SS), a station (STA) and the like.

Specific terminologies used for the following description may be provided to help the understanding of the present invention. And, the use of the specific terminology may be modified into other forms within the scope of the technical idea of the present invention.

Occasionally, to avoid obscuring the concept of the present invention, structures and/or devices known to the public may be skipped or represented as block diagrams centering on the core functions of the structures and/or devices. Wherever possible, the same reference numbers will be used throughout the drawings to refer to the same or like parts in this specification.

The embodiments of the present invention may be supported by the disclosed standard documents of at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document may be supported by the above standard documents.

The following description of embodiments of the present invention may apply to various wireless access systems including CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications/General Packet Radio Service/Enhanced Data Rates for GSM Evolution). OFDMA can be implemented with such a radio technology as IEEE 802.11 (Wi-Fi), IEEE 802.16 (WiMAX), IEEE 802.20, E-UTRA (Evolved UTRA), etc. UTRA is a part of UMTS (Universal Mobile Telecommunications System). 3GPP (3rd Generation Partnership Project) LTE (long term evolution) is a part of E-UMTS (Evolved UMTS) that uses E-UTRA. The 3GPP LTE adopts OFDMA in downlink and SC-FDMA in uplink. And, LTE-A (LTE-Advanced) is an evolved version of 3GPP LTE. WiMAX may be supported by IEEE 802.16e standard (WirelessMAN-OFDMA Reference System) advanced IEEE 802.16m (WirelessMAN-OFDMA Advanced System). For clarity, the present invention is described centering on IEEE 802.11 system. However, the technical idea of the present invention will not be limited thereto.

FIG. 1 shows a schematic diagram of a network structure of E-UMTS. Generally, E-UMTS can be called LTE (long term evolution) system. For the details of the technical specifications of UMTS and E-UMTS, Release 7 and Release 8 of '3$^{rd}$ Generation Partnership Project: Technical Specification Group Radio Access Network' can be referred to.

Referring to FIG. 1, E-UMTS consists of a user equipment (UE) 120, base stations (eNode B: eNB) 110a and 110b and an access gateway (AG) provided to an end terminal of a network (E-UTRAN) to be connected to an external network. The base station is able to simultaneously transmit multi-data stream for a broadcast service, a multicast service and/or a unicast service. At least one or more cells exist in one base station. The cell is set to one of bandwidths including 1.25 MHz, 2.5 MHz, 5 MHz, 10 MHz, 15 MHz, 20 MHz and the like. Different cells can be set to provide different bandwidths, respectively. A base station controls data transmissions and receptions for a plurality of user equipments. A base station transmits downlink scheduling information on downlink (DL) data to inform a corresponding user equipment of time/frequency domain for transmitting data, coding, data size, HARQ (hybrid automatic repeat and request) relevant information and the like. And, the base station transmits uplink scheduling information on uplink (UL) data to a corresponding user equipment to inform the corresponding user equipment of time/frequency domain available for the corresponding user equipment, coding, data size, HARQ relevant information and the like. A core network (CN) can consist of an AG, a network node for user registration of a user equipment and the like. The AG manages mobility of the user equipment by a unit of TA (tracking area) including a plurality of cells.

FIG. 2 shows structures of control and user planes of a radio interface protocol between a user equipment and E-UTRAN based on 3GPP radio access network standard. First of all, a control plane means a passage for transmitting control messages used by a user equipment and a network to manage a call. A user plane means a passage for transmitting such data generated from an application layer as voice data, internet packet data and the like.

A physical (PHY) layer, i.e., a first layer, provides an information transfer service to an upper layer using a physical channel. The physical layer is connected to a medium access control layer located above through a transport channel. Data are transferred between the MAC layer and the PHY layer through the transport channel. And, Data are transferred between a PHY layer of a transmitting side and a PHY layer of a receiving side through a physical channel. The physical channel uses time and frequency as radio resources. Particularly, the physical channel is modulated in downlink by OFDMA scheme and is modulated in uplink by SC-FDMA scheme.

A medium access control layer of a second layer provides a service to a radio link control (hereinafter abbreviated RLC) layer of an upper layer through a logical channel. The RLC layer of the second layer supports reliable data transfer. A function of the RLC layer can be implemented using a function block within the MAC. A packet data convergence protocol (hereinafter abbreviated PDCP) layer of the second layer performs a header compression function for reducing unnecessary control information to transmit such an IP packet as IPv4 and IPv6 in a radio interface having a narrow bandwidth.

A radio resource control (hereinafter abbreviated RRC) layer located on a lowest level of a third layer is defined in a control plane only. The RRC layer is responsible for controlling the logical channel, the transport channel and the physical channel in association with configuration, reconfiguration and release of radio bearers (RBs). In this case, the RB means a service provided by the second layer for data transfer between a user equipment and a network. To this end, the RRC layer of the user equipment exchanges RRC messages with the RRC layer of the network. In case that an RRC connection is established between an RRC layer of a user equipment and an RRC layer of a network, the user equipment is in connected mode. Otherwise, the user equipment is in idle mode. NAS (non-access stratum) layer above an RRC layer performs a function of session management, a function of mobility management and the like.

Figure 3:
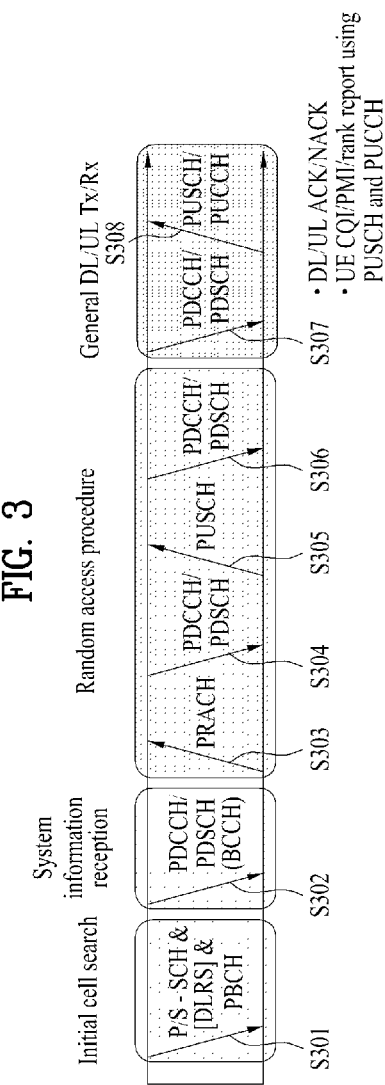
FIG. 3 is a diagram for an example of physical channels in LTE system and signal transmission using the same.

FIG. 3 illustrates physical channels in LTE system and signal transmission using the same.

If power of a user equipment is turned on or the user equipment enters a new cell, the user equipment performs an initial cell search for matching synchronization with a base station and the like [S301]. To this end, the user equipment receives a primary synchronization channel (P-SCH) and a secondary synchronization channel (S-SCH) from the base station, matches synchronization with the base station and is then able to obtain information such as a cell identity (ID)

and the like. Subsequently, the user equipment receives PBCH (physical broadcast channel) from the base station and is then able to obtain intra-cell broadcast information.

As a representative example of the intra-cell broadcast information, system information may be considered. The system information is repeatedly broadcasted through PBCH and is necessary for a user equipment to access a cell and to operate in the cell. The system information includes MIB (master information block) and SIBs (system information blocks). Table 1 shows one example of MIB.

TABLE 1

```
-- ASN1START
MasterInformationBlock ::=    SEQUENCE {
    dl-Bandwidth              ENUMERATED {n6, n15, n25, n50, n75,
                              n100},
    phich-Config              PHICH-Config,
    systemFrameNumber         BIT STRING (SIZE (8)),
    spare                     BIT STRING (SIZE (10))
}
-- ASN1STOP
```

Referring to Table 1, the MIB includes a downlink system bandwidth (DL BW: dl-Bandwidth), a PHICH (physical hybrid-ARQ indicator channel) configuration and SFN (system frame number). Moreover, 10-bit (spare) is not used but reserved for a reserved field. By receiving the MIB, a user equipment can be aware of information on DL BW, SFN and PHICH configuration explicitly. The PHICH configuration includes the number of OFDM symbols occupied by a PHICH region and information on the amount of resources reserved for PHICH in a control region.

The PHICH is transmitted through first m (where m≥1) OFDM symbols among OFDM symbols of each subframe. And, PHICH and other control signals are transmitted through specific resource elements (REs) within first n (where n≥m) OFDM symbols of the corresponding subframe. Meanwhile, PDCCH (physical downlink control channel) is transmitted through REs except the former REs for carrying the above-mentioned PHICH and other control signals within the n OFDM symbols of the subframe. Hence, in order to receive scheduling information through the PDCCH of each subframe, the user equipment should know how PHICHs are mapped to the corresponding subframe.

Having completed the initial cell search, the user equipment receives a physical downlink control channel (PDCCH) and a physical downlink shared control channel (PDSCH) according to information carried on the PDCCH and is then able to obtain system information in further detail [S302].

Meanwhile, if the user equipment initially accesses the base station or fails to have a radio resource for signal transmission, the user equipment is able to perform a random access procedure (RACH) on the base station [S303 to S306]. To this end, the user equipment transmits a specific sequence as a preamble through a physical random access channel (PRACH) [S303, S305] and is then able to receive a response message through PDCCH and a corresponding PDSCH in response to the preamble [S304, S306]. In case of contention based RACH, it is able to perform a contention resolution procedure in addition.

Having performed the above mentioned procedures, the user equipment is able to perform PDCCH/PDSCH reception [S307] and PUSCH/PUCCH (physical uplink shared channel/physical uplink control channel) transmission [S308] as a general uplink/downlink signal transmission procedure. Control information transmitted/received in uplink/downlink to/from the base station by the user equipment includes ACK/NACK signal, CQI (channel quality indicator), PMI (precoding matrix index), SR (scheduling request), RI (rank indicator) and the like. In case of the 3GPP LTE system, the user equipment is able to transmit the above mentioned control information such as CQI/PMI/RI and the like through PUSCH and/or PUCCH.

Figure 4:
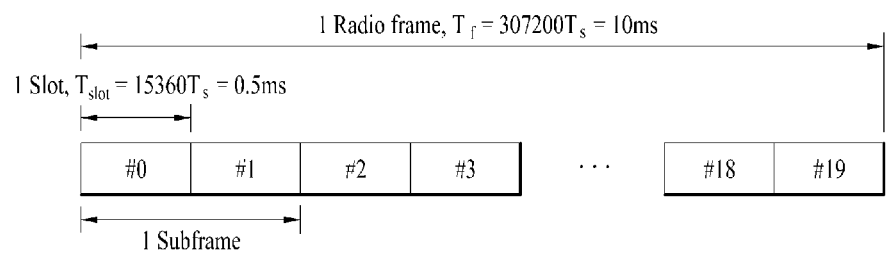
FIG. 4 is a diagram for an example of a structure of a radio frame used in LTE.

FIG. 4 illustrates a structure of a radio frame used in LTE.

Referring to FIG. 4, a radio frame has a length of 10 ms (327200×$T_s$) and is constructed with 10 subframes in equal size. Each of the subframes has a length of 1 ms and is constructed with two slots. Each of the slots has a length of 0.5 ms (15360×$T_s$). In this case, $T_s$ indicates a sampling time and is expressed as $T_s=1/(15 \text{ kHz} \times 2048)=3.2552 \times 10^{-8}$ (about 33 ns). The slot includes a plurality of OFDM symbols in a time domain and includes a plurality of resource blocks (RB) in a frequency domain. In the LTE system, one resource block includes '12 subcarriers×7 or 6 OFDM symbols'. A transmission time interval (TTI), which is a unit time for transmitting data, can be determined by at least one subframe unit. The above described structure of the radio frame is just exemplary. And, the number of subframes included in a radio frame, the number of slots included in a subframe and/or the number of OFDM symbols included in a slot can be modified in various ways.

Figure 5:
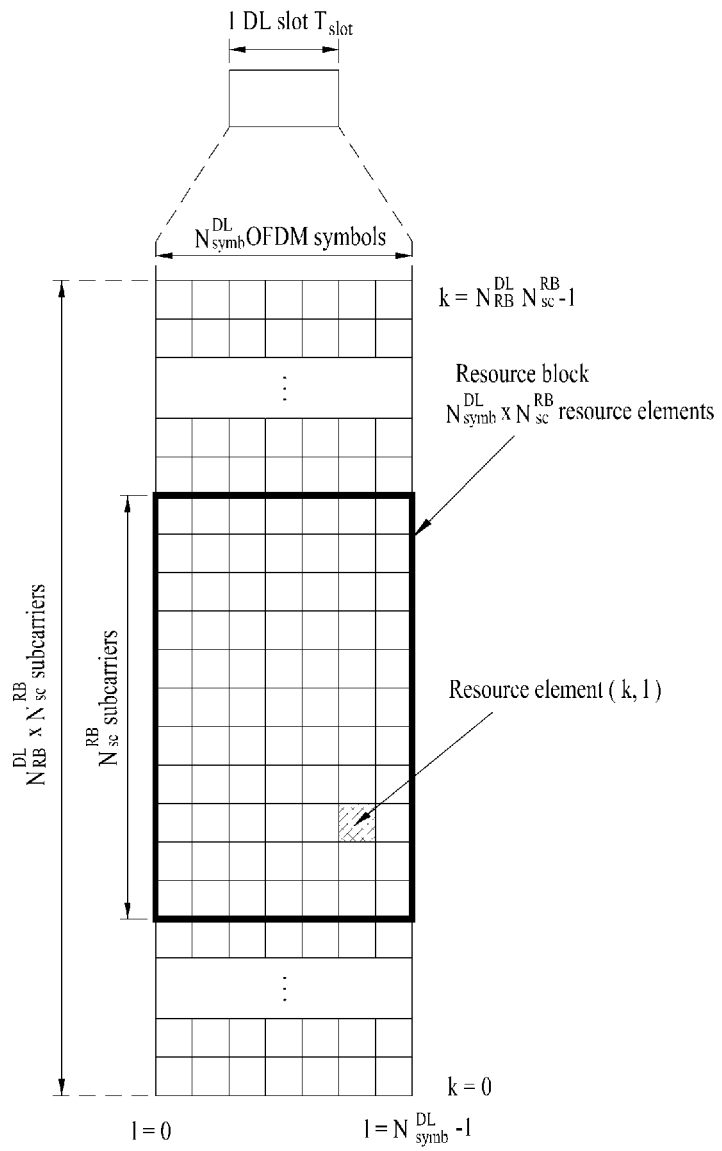
FIG. 5 is a diagram for an example of a resource grid for a downlink slot.

FIG. 5 is a diagram for an example of a resource grid for a downlink slot.

Referring to FIG. 5, one downlink slot includes a plurality of OFDM symbols in time domain and a plurality of resource blocks in frequency domain. Although it is illustrated in FIG. 5 that one downlink slot includes 7 OFDM symbols and one resource block includes 12 subcarriers, the present invention may be not limited thereto. For instance, the number of OFDM symbols included in a downlink slot may be changed depending on a length of CP (cyclic prefix). Each element on a resource grid is called a resource element. One resource block includes 12×7 resource elements. The number NDL of resource blocks included in a downlink slot may depend on a downlink transmission bandwidth.

Figure 6:
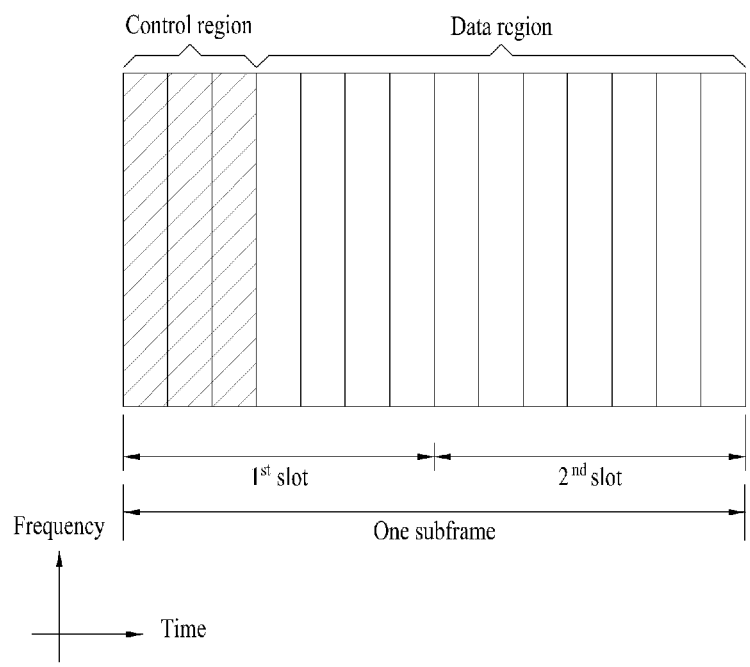
FIG. 6 is a diagram for an example of a structure of a downlink subframe.

FIG. 6 is a diagram for an example of a structure of a downlink subframe

Referring to FIG. 6, maximum 3 or 4 OFDM symbols located in the head of a first slot of a subframe correspond to a control region to which a control channels is allocated. The rest of OFDM symbols correspond to a data region to which PDSCH (physical downlink shared channel) is allocated. Examples of downlink control channels used in LTE may include PCFICH (physical control format indicator channel), PDCCH (physical downlink control channel), PHICH (physical hybrid ARQ indicator Channel) and the like. The PCFICH is transmitted in a first OFDM symbol of a subframe and carries information on the number of OFDM symbols used for transmission of a control channel within the subframe. The PHICH carries HARQ ACK/NACK (hybrid automatic repeat request acknowledgement/negative-acknowledgement) signals in response to uplink transmission.

Control information transmitted through the PDCCH is referred to as downlink control information (DCI). DCI format 0 is defined for uplink and DCI formats 1, 1A, 1B, 1C, 1D, 2, 2A, 3 and 3A are defined for downlink. A DCI format selectively includes information such as hopping flag, RB allocation, modulation and coding scheme (MCS), redundancy version (RV), new data indicator (NDI), transmit power control (TPC), cyclic shift demodulation reference signal (DM RS), channel quality indicator (CQI) request, HARQ process number, transmitted precoding matrix indicator (TPMI), precoding matrix indicator (PMI) confirmation, and the like according to the purpose thereof.

The PDCCH carries transport format and resource allocation information of a downlink shared channel (DL-SCH), transport format and resource allocation information of an uplink shared channel (UL-SCH), paging information on a paging channel (PCH), system information on the DL-SCH, resource allocation information of an upper-layer control message such as a random access response transmitted on PDSCH, a Tx power control command set with respect to individual UEs in a UE group, a Tx power control command, information for indicating activation of voice over IP (VoIP), etc. A plurality of PDCCHs may be transmitted in the control region and a user equipment can monitor a plurality of PDCCHs. The PDCCH is transmitted on aggregation of one or a plurality of continuous control channel elements (CCEs). The CCE is a logical assignment unit used to provide a coding rate based on the status of a radio channel to the PDCCH. The CCE corresponds to a plurality of resource element groups (REGs). The format of the PDCCH and the number of bits of the PDCCH are determined depending on the number of CCEs. The base station determines a PDCCH format depending on the DCI to be transmitted to the user equipment and attaches cyclic redundancy check (CRC) to the control information. The CRC is masked with an identifier (for example, radio network temporary identifier (RNTI)) depending on usage of the PDCCH or owner of the PDCCH. For example, if the PDCCH is for a specific user equipment, the CRC may be masked with an identifier (for example, cell-RNTI (C-RNTI)) of the corresponding user equipment. If the PDCCH is for a paging message the CRC may be masked with a paging identifier (for example, paging-RNTI (P-RNTI)). If the PDCCH is for system information (more particularly, system information block (SIB)), the CRC may be masked with system information RNTI (SI-RNTI). If the PDCCH is for a random access response, the CRC may be masked with a random access RNTI (RA-RNTI).

Heterogeneous Network Environment

Figure 7:
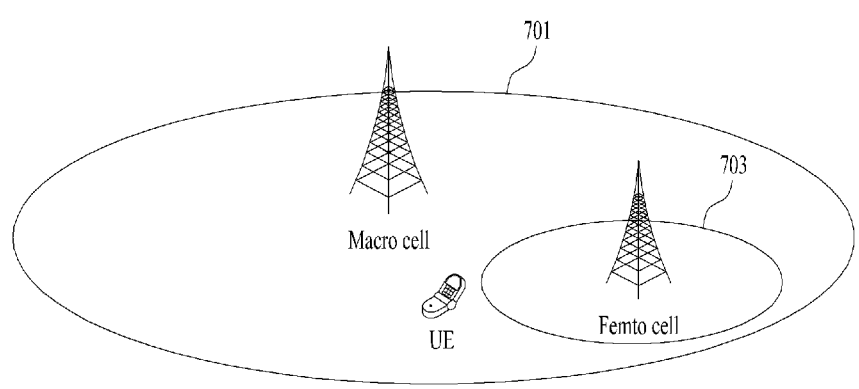
FIG. 7 is a diagram for one example of a heterogeneous network system including a macro cell and a femto cell.

FIG. 7 is a diagram for one example of a heterogeneous network system including a macro cell and a femto cell.

A macro cell has wide coverage and high transmission power and means a general base station of a wireless communication system. The macro cell may be called a macro base station.

A femto cell is a small version of a macro cell and independently operates by performing most of functions of the macro cell. The femto cell may be called a femto base station, a micro cell, a pico cell, a home evolved Node B, a relay or the like. Moreover, the femto cell may mean a cell overlaid in a macro cell covered area or a cell of a non-overlay type that can be installed in a shadow area not covered by the macro cell. The femto cell has coverage narrower than that of a macro cell and transmission power lower than that of the macro cell and is able to accommodate user equipments less than those of the macro cell.

A user equipment may be served by a macro cell or a femto cell depending on communication environments of the macro cell and the femto cell. Although it is illustrated in the example of FIG. 7 that coverage 703 of a femto cell is entirely included in coverage 701 of a macro cell, only a part of the coverage of the femto cell may be included. If a user equipment is located in the coverage 703 of the femto cell, a communication environment between the user equipment and the femto cell may be better than that between the user equipment and the macro cell. Generally, in case that the user equipment is located within the coverage 703 of the femto cell, the user equipment is served by the femto cell.

Cell Range Expansion (CRE)

In a heterogeneous network environment, a problem may be caused by difference between a macro cell and a femto cell. For instance, asymmetric transmit powers in uplink and downlink may cause a problem. If a user equipment determines a cell with maximum RSRP (reference signal received power) as its serving cell, due to difference between transmit powers of the macro cell and the femto cell, downlink coverage of the macro cell is wider than that of the femto cell. On the other hand, since a user equipment corresponds to a transmitter in case of uplink transmission, coverage in uplink is different from the coverage in downlink. Thus, an optimum cell selection scheme in downlink is also different from that in uplink. If some user equipments access the macro cell in consideration of the above-mentioned matters despite the fact that the femto cell corresponds to the optimum cell, it may cause an interference problem to the femto cell. Moreover, if the number of user equipments accessing the femto cell is smaller than the number of user equipments accessing the macro cell, it may also cause a problem. The above-mentioned problems can be solved by setting an appropriate handover standard and such a scheme for solving the problems is referred to as CRE.

For example, although the user equipment is located within the coverage of the macro cell as shown in FIG. 7, handover of the user equipment from the macro cell into the femto cell can be performed for QoS (quality of service) of an entire network according to CRE scheme. In case of 3GPP LTE system, if reception signal power from a macro cell is greater than that from a femto cell by 10 dB, handover of a user equipment into the femto cell can be made through the CRE.

When handover of a user equipment from a macro cell into a femto cell is performed according to CRE, there are two types of methods for the user equipment to obtain MIB of the femto cell. As a first method, a PBCH interference cancellation method is considered. According to the BCH interference cancellation method, a user equipment detects MIB of a macro cell transmitted through PBCH and then detects MIB of a femto cell in a manner of eliminating the detected MIB of the macro cell from an entire reception signal. However, this method has disadvantages in that it cannot be applied to a case of using a non-synchronous scheme. Moreover, it is difficult to eliminate the MIB of the macro cell accurately since it is impossible to be aware of a transmit power ratio of PBCH to CRS (cell specific reference signal). As a second method, a macro cell may transmit MIB of a femto cell to a user equipment using a UE-specific signal (e.g., through a downlink shared channel). In this case, the MIB of the femto cell can be obtained accurately compared to the PBCH interference cancellation method. However, if the MIB of the femto cell is changed after handover of the user equipment from the macro cell into the femto cell, it may cause a problem that the macro cell is difficult to transmit the changed MIB to the user equipment.

Hereinafter, described based on the second method is a method of transmitting changed MIB (particularly, PHICH configuration) in case that MIB of a femto cell is changed after handover of a user equipment from a macro cell into the femto cell.

Transmission Method of Changed PHICH Configuration

In information included in MIB, PHICH configuration has a high probability of being changed compared to other information. Since a macro cell has wide coverage than that of a femto cell and a multitude of connected user equipments, the macro cell has less necessity of changing the PHICH configuration. However, since a femto cell has a very small number of connected user equipments compared to the macro cell, the number of symbols in a control region may be changed. Thus, it may be necessary to dynamically change the PHICH configuration.

If the PHICH configuration is dynamically changed, it may cause a problem that the user equipment, which is handed over to the femto cell is difficult to receive the changed PHICH configuration after the handover in a manner of receiving MIB of the femto cell from the macro cell as a UE-specific signal. Moreover, in case that the PHICH configuration is changed, the user equipment should be aware of a timing (e.g., offset information) at which the changed PHICH configuration is applied.

FIG. 8 is a flowchart to describe a method for a user equipment to receive control information according to one embodiment of the present invention.

Hereinafter, described with reference to FIG. 8 is a method for a user equipment, of which handover from a macro cell into a femto cell is performed according to CRE, to receive changed PHICH configuration information or offset information in case that a PHICH configuration is changed after the handover.

First of all, a user equipment currently accessing a macro cell in a heterogeneous environment receives first PHICH configuration information on a femto cell from the macro cell [S801]. If CRE is required, handover of the user equipment, which accesses the macro cell in the heterogeneous environment, from the macro cell into the femto cell can be performed. For instance, if the macro cell determines that the handover of the user equipment is necessary for the CRE, the macro cell transmits a handover request message to a femto base station and is then able to receive information required for the handover in response to the handover request message. Subsequently, a macro base station transmits the information required for the handover to the user equipment. The information required for the handover may include MIB of the femto cell and the user equipment according to the present invention receives the MIB of the femto cell from the macro cell as a UE-specific signal. The MIB of the femto cell contains the first PHICH configuration information on the femto cell, a downlink bandwidth and a system frame number.

Having received the first PHICH configuration information, the user equipment performs the handover into the femto cell [S803]. In particular, if a handover preparation procedure including the above-mentioned step S801 is completed, the user equipment performs the handover into the femto cell. For instance, the user equipment performs a network entry into the femto cell based on the information required for the handover received from the macro base station. While performing a procedure for the network entry into the femto cell, the user equipment may communicate with the macro base station in an interval in which communication with the macro base station is available. If the user equipment completes the procedure for the network entry into the femto cell, the femto cell may notify the macro cell of completion of the handover. Thereafter, the user equipment releases a link with the macro cell and then establishes a link with the femto cell.

Subsequently, the user equipment configures a PHICH interval using a first number of OFDM symbols according to the first PHICH configuration information. The PHICH interval means an interval in which PHICH is transmitted among OFDM symbols of each subframe. Moreover, since PDCCH is transmitted through REs except the REs for transmitting PHICH and PCFICH, the user equipment may receive scheduling information in REs not corresponding to the PHICH interval through PDCCH In this case, after configuring the PHICH interval according to the first PHICH configuration information, it may be considered that the PHICH interval of the femto cell is dynamically changed. The femto cell has a very small number of served user equipments compared to the macro cell. Thus, in the case of the femto cell, resource can be used more efficiently in a manner of modifying uplink resource allocation and downlink resource allocation depending on variation in the number of user equipments connected to the femto cell. According to the present invention, the user equipment of which the handover from the macro cell into the femto cell is performed in accordance with CRE can receive a changed PHICH configuration using the method explained in the following description.

The user equipment receives second PHICH configuration information from the femto cell through a downlink shared channel (DL-SCH) [S807]. The user equipment can receive the second PHICH configuration information from the femto cell in the following manner.

First of all, the femto cell may transmit changed PHICH configuration information (i.e., second PHICH configuration information) to the user equipment using MAC-CE (control element). In order to transmit the second PHICH configuration information using MAC-CE, DL-SCH LCID may be set as shown in FIG. 8. In this case, LCID (logical channel ID) indicates information included in MAC-CE corresponding to each LCID field.

FIG. 9 is a diagram for one example of LCID (logical channel ID) field according to the present invention. Referring to FIG. 9, index 01011 of LCID field indicates that corresponding MAC-CE includes PHICH reconfiguration information.

Figure 10:
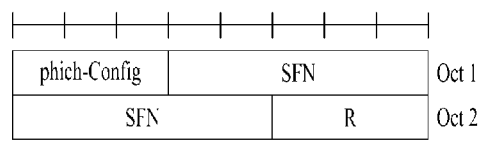
FIG. 10 is a diagram for one example of MAC-CE containing PHICH reconfiguration information.

FIG. 10 is a diagram for one example of MAC-CE containing PHICH reconfiguration information. Referring to FIG. 10, second PHICH configuration information has a length of 3 bits and is then able to be mapped to OCT (octet) 1 of MAC-CE. For instance, in 3 bits of the second PHICH configuration information, 1 bit may indicate the number of OFDM symbols occupied by a PHICH region and 2 bits may indicate the amount of resources reserved for PHICH within a control region. In particular, a user equipment may receive the second PHICH configuration information corresponding to information on a changed PHICH configuration using MAC-CE in FIG. 10.

Moreover, a femto cell may transmit offset information indicating a timing at which the second PHICH configuration information is applied as well as the second PHICH configuration information to a user equipment. By obtaining the offset information, the user equipment may apply the changed PHICH configuration together with other user equipments, which receive a PHICH configuration (MIB) through PBCH from the femto cell, at the same timing.

Figure 11:
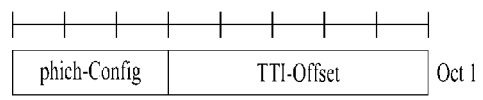
FIG. 11 is a diagram for one example of MAC-CE containing both PHICH reconfiguration information and offset information.

FIG. 11 is a diagram for one example of MAC-CE containing both PHICH reconfiguration information and offset information. Referring to FIG. 11, a 3-bit length of second PHICH configuration information and a 5-bit length of offset information (TTI-offset) may be mapped to OCT 1 of MAC-CE.

Meanwhile, a femto cell may receive PHICH configuration information or offset information using an RRC message. For example, the femto cell may transmit the PHICH configuration information or the offset information by mapping the PHICH configuration information or the offset information to a reserved region among SIB (system information block) type 1 to SIB type 13. Moreover, the femto cell may transmit the PHICH configuration information or the offset information by mapping the PHICH configuration information or the offset information to a reserved region of an RRC signaling message.

Figure 12:
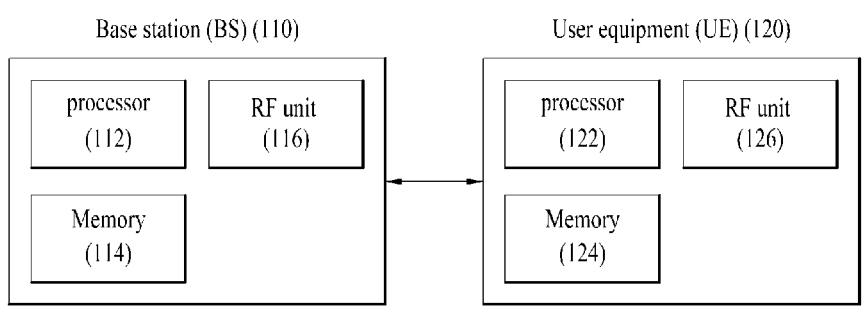
FIG. 12 is a diagram for an example of a base station and a user equipment applicable to one embodiment of the present invention.

FIG. 12 is a diagram for an example of a base station and a user equipment applicable to one embodiment of the present invention.

Referring to FIG. 12, a wireless communication system includes a base station BS 110 and a user equipment UE 120. In downlink, a transmitter may be a part of the base station 110 and a receiver may be a part of the user equipment 120. In uplink, a transmitter may be a part of the user equipment 120 and a receiver may be a part of the base station 110. The base station 110 includes a processor 112, a memory 114 and an RF (radio frequency) unit 116. The processor 112 can be configured to implement the procedures and/or methods proposed by the present invention. The memory 114 is connected to the processor 112 and stores various kinds of informations related to operations of the processor 112. The RF unit 116 is connected to the processor 112 and transmits and/or receives radio or wireless signals. The user equipment 120 includes a processor 122, a memory 124 and an RF unit 126. The processor 122 can be configured to implement the procedures and/or methods proposed by the present invention. The memory 124 is connected to the processor 122 and stores various kinds of informations related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

The embodiments of the present invention have been described based on data transmission and reception between a base station and a user equipment. A specific operation which has been described as being performed by the base station may be performed by an upper node of the base station as the case may be. In particular, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as mobile station (MS) and mobile subscriber station (MSS).

The embodiments of the present invention may be implemented using various means. For instance, embodiments of the present invention may be implemented using hardware, firmware, software and/or any combinations thereof. In case of the implementation by hardware, one embodiment of the present invention may be implemented by one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then drivable by a processor. The memory unit may be provided within or outside the processor to exchange data with the processor through the various means known to the public.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

INDUSTRIAL APPLICABILITY

Although a method proposed in the present invention is mainly described with reference to the examples of applying to 3GPP LTE system, the method is applicable to various kinds of wireless communication systems as well as to the 3GPP LTE system.

What is claimed is:

1. A method of receiving control information received by a user equipment in a heterogeneous network system including a macro cell and a femto cell, the method comprising:
    receiving a first PHICH (physical hybrid-ARQ indicator channel) configuration information on the femto cell from the macro cell;
    performing a handover from the macro cell into the femto cell;
    configuring a PHICH interval as a first number of OFDM (orthogonal frequency division multiplexing) symbols in accordance with the first PHICH configuration information;
    receiving a second PHICH configuration information and offset information indicating a timing of applying the second PHICH configuration information from the femto cell through a downlink shared channel (DL-SCH); and
    reconfiguring the PHICH interval as a second number of the OFDM symbols in accordance with the second PHICH configuration information.

2. The method of claim 1, wherein the second PHICH configuration information is received through an MAC (medium access control) control element.

3. The method of claim 1, wherein the offset information is received through an MAC (medium access control) control element.

4. The method of claim 1, wherein the offset information is received through an RRC (radio resource control) message.

5. The method of claim 1, wherein the second PHICH configuration information is received through an RRC (radio resource control) message.

6. The method of claim 1, wherein reception signal strength between the user equipment and the femto cell is lower than reception signal strength between the user equipment and the macro cell and wherein the handover of the user equipment from the macro cell into the femto cell is performed for cell range expansion.

7. The method of claim 1, wherein the downlink shared channel comprises a channel specified for the user equipment.

8. A method of transmitting control information transmitted by a femto cell in a heterogeneous network system including a macro cell and the femto cell, the method comprising:
receiving downlink channel information including a downlink channel signal measurement value from a user equipment handed over from the macro cell;
transmitting PHICH (physical hybrid-ARQ indicator channel) configuration information and offset information indicating a timing of applying the second PHICH configuration information to the user equipment through a downlink shared channel (DL-SCH) when the downlink channel signal measurement value is equal to or smaller than a reference value.

9. The method of claim 8, further comprising:
transmitting the PHICH configuration information to the user equipment through a physical broadcast channel (PBCH) when the downlink channel signal measurement value is greater than the reference value.

10. The method of claim 8, wherein the PHICH configuration information is transmitted through one of an MAC (medium access control) control element and an RRC (radio resource control) message.

11. The method of claim 8, wherein the offset information is transmitted through one of an MAC (medium access control) control element and an RRC (radio resource control) message.

12. A user equipment of receiving control information in a heterogeneous network system including a macro cell and a femto cell, the user equipment comprising:
an RF (radio frequency) unit; and
a processor configured to:
receive a first PHICH (physical hybrid-ARQ indicator channel) configuration information on the femto cell from the macro cell,
perform a handover from the macro cell into the femto cell,
configure a PHICH interval as a first number of OFDM (orthogonal frequency division multiplexing) symbols in accordance with the first PHICH configuration information after the handover,
receive a second PHICH configuration information and offset information indicating a timing of applying the second PHICH configuration information from the femto cell through a downlink shared channel (DL-SCH),
reconfigure the PHICH interval as a second number of the OFDM symbols in accordance with the second PHICH configuration information.

13. A femto cell transmitting control information in a heterogeneous network system including a macro cell and the femto cell, the femto cell comprising:
an RF (radio frequency) unit; and
a processor configured to:
receive downlink channel information including a downlink channel signal measurement value from a user equipment handed over from the macro cell, and
transmit PHICH (physical hybrid-ARQ indicator channel) configuration information and offset information indicating a timing of applying the second PHICH configuration information to the user equipment through a downlink shared channel (DL-SCH) when the downlink channel signal measurement value is equal to or smaller than a reference value.

* * * * *